(12) United States Patent
Bosch et al.

(10) Patent No.: US 6,437,041 B1
(45) Date of Patent: Aug. 20, 2002

(54) AQUEOUS COATING AGENT, PREPARATION OF THE SAME AND USE THEREOF FOR MULTI-LAYERED LACQUERING

(75) Inventors: Werner Bosch, Wuppertal; Armin Göbel, Wetter; Holger Schmidt, Wuppertal; Bettina Vogt-Birnbrich, Solingen, all of (DE)

(73) Assignee: E. I. du Pont de Nemours & Company, Wilmington, DE (US)

( * ) Notice: Subject to any disclaimer, the term of this patent is extended or adjusted under 35 U.S.C. 154(b) by 0 days.

(21) Appl. No.: 09/601,669
(22) PCT Filed: Jan. 20, 1999
(86) PCT No.: PCT/EP99/00359
§ 371 (c)(1), (2), (4) Date: Sep. 29, 2000
(87) PCT Pub. No.: WO99/40139
PCT Pub. Date: Aug. 12, 1999

(30) Foreign Application Priority Data

Feb. 7, 1998 (DE) .......................................... 198 05 004

(51) Int. Cl.[7] .............................................. C08L 83/00
(52) U.S. Cl. ....................................... 524/506; 524/507
(58) Field of Search ................................ 524/589, 506, 524/507

(56) References Cited

U.S. PATENT DOCUMENTS

| 4,373,043 A | * | 2/1983 | Yagi ............................. 524/130 |
| 5,670,600 A | * | 9/1997 | Nienhaus ....................... 528/75 |
| 5,681,622 A |   | 10/1997 | Vogt-Birnbrich et al. 527/407.1 |
| 5,760,123 A |   | 6/1998 | Vogt-Birnbrich et al. ... 524/500 |
| 5,876,802 A | * | 3/1999 | Brunnemann ................ 427/409 |
| 5,886,082 A | * | 3/1999 | Numa .......................... 524/501 |

FOREIGN PATENT DOCUMENTS

| EP | 297576 | 1/1989 |
| EP | 0 353 797 | 2/1990 |

* cited by examiner

*Primary Examiner*—Paul R. Michl

(57) ABSTRACT

Aqueous coating agents suitable for multi-layered finishes containing an aqueous binder dispersion based on polyurethane/polymer hybrid polymers with a ratio by weight of polyurethane fraction to polymer fraction of 0.1:1 to 50:1, with a hydroxyl value of 0 to 150 mg KOH/g, an acid value of 1.5 to 60 mg KOH/g, and a concentration of 0.5 to 300 mmol of silicon per 100 g of solid resin in the form of siloxane bridges (—Si—O—Si—) incorporated into the polyurethane fraction and/or in the form of silanol groups bonded to the polyurethane fraction, obtainable by polymerization of olefinically unsaturated monomers in the presence of polyurethane prepolymers which do not contain olefinic double bonds.

8 Claims, No Drawings

AQUEOUS COATING AGENT, PREPARATION OF THE SAME AND USE THEREOF FOR MULTI-LAYERED LACQUERING

BACKGROUND OF THE INVENTION

The invention provides aqueous coating agents which contain aqueous binder dispersions based on hybrid polymers which are prepared by radical copolymerisation of olefinically unsaturated monomers in the presence of aqueous dispersed polyurethane resins which contain siloxane bridges and/or silanol groups but do not contain double bonds. It also provides a process for preparing the aqueous coating agents and a process for multi-layer finishing using these coating agents, in particular as a water-based base-coat lacquer in a process for preparing decorative multi-layer finishes of the water-based base-coat lacquer/clear lacquer type.

Polyurethane/poly(meth)acrylate hybrid polymers are known as binders for aqueous coating agents.

EP-A-0 297 576 describes the polymerisation of (meth) acrylic monomers in the presence of previously prepared polyurethane dispersions. After the completion of polymerisation, aqueous base-coat lacquers can be prepared from the dispersions obtained.

EP-A-0 353 797 describes the preparation of a hydroxy-functional polyurethane resin in an olefinically unsaturated monomer as solvent, wherein the unsaturated monomer may be reactive towards isocyanate. After converting the polyurethane solution into the aqueous phase, emulsion polymerisation is performed. The hybrid polymer dispersion obtained may be used as a water-based base-coat lacquer binder.

WO 95 28 429 discloses aqueous polyurethane dispersions suitable for use as binders for water-based base-coat lacquers which are stabilised by ionic and/or hydrophilic groups and are based on polyurethane resins chain-lengthened via siloxane bridges.

WO 95 28 428 discloses a process for preparing a multi-layered finish by using a self-cross-linking water-based base-coat lacquer which contains, as binder, an aqueous polyurethane resin dispersion based on a polyurethane resin with hydroxyl groups and/or R'O groups which are bonded to silicon in lateral and/or terminal positions.

In order to avoid the appearance of sagging, it is desirable that aqueous coating agents have high run limits. Otherwise, the layers can be applied in only limited thicknesses and, in particular in the case of colours with low covering power, application in several spray passes with intermediate drying, or intermediate evaporation is required.

The applicant suggested, in patent applications PCT/EP 97/04821 and P 197 46 327 which do not have priority over this document, coating agents which can be used as water-based base-coat lacquers which contain aqueous binder dispersions based on hybrid polymers which are prepared by the radical copolymerisation of polyurethane resins which contain siloxane bridges and/or silanol groups and also olefinic double bonds with olefinically unsaturated comonomers.

The object of the present invention is the provision of aqueous coating agents with high sagging limits which are suitable in particular for multi-layered finishes, in particular for the provision of colour and/or effect-providing layers. They are intended to be applicable in only a single spray pass in a thick layer to give an opaque surface coating.

SUMMARY OF THE INVENTION

The invention provides aqueous coating agents containing an aqueous binder dispersion and also optionally one or more organic solvents, cross-linking agents, pigments, fillers, conventional lacquer additives and/or one or more further binders, which are characterised in that the aqueous binder dispersion is based on polyurethane/polymer hybrid polymers with a ratio by weight of polyurethane fraction to polymer fraction of 0.1:1 to 50:1, wherein the polyurethane fraction of the polyurethane/polymer hybrid polymer does not contain any olefinic double bonds and has a hydroxyl value of 0 to 150, with respect to the solid resin, wherein hydroxyl groups bonded to silicon do not enter into the calculation for the OH value, and an acid value of 1.5 to 60 mg KOH/g, with respect to solid resin, and a concentration of 0.5 to 300 mmol of silicon per 100 g of solid resin in the form of siloxane bridges (—Si—O—Si—) incorporated into the polyurethane fraction and/or in the form of silanol groups bonded to the polyurethane fraction. The polyurethane/polymer hybrid polymers are obtainable by polymerisation of olefinically unsaturated monomers in the presence of polyurethane prepolymers which do not contain olefinic double bonds.

The hybrid polymers consist of polyurethane fractions and polymer fractions. The polyurethane fraction and the polymer fraction may be present as an interpenetrating network and/or the polymer fraction may be grafted onto the polyurethane fraction. The olefinic double bonds in the olefinically unsaturated monomers which participate in building up the polymer fraction in the polyurethane/polymer hybrid polymer are allylic and/or vinylic double bonds and/or alpha/beta-unsaturated carbonyl groups, for example preferably (meth)acrylic double bonds. The proportion of allylic double bonds is preferably less than 10%, whereas the proportion of (meth)acryloyl groups is at least 50%, preferably more than 70%. If more than 50% of the olefinic double bonds contributing to polymerisation are from (meth)acryloyl groups, then the hybrid polymers are polyurethane/poly(meth)acrylate hybrid polymers.

DETAILED DESCRIPTION OF THE INVENTION

The binder dispersion based on polyurethane/polymer hybrid polymers used in aqueous coating agents according to the invention has an acid value of 1.5 to 60 mg KOH/g, preferably 3 to 40 mg KOH/g, with respect to solid resin. At least 70% of the acid groups are preferably exclusively constituents of the polyurethane fraction. The acid groups stabilise the hybrid polymer particles in the aqueous phase. The polyurethane/polymer hybrid polymers may contain additional stabilising hydrophilic non-ionic groups, for example polyalkylene oxide groups, e.g. polyethylene oxide groups.

The binder dispersion based on polyurethane/polymer hybrid polymers used in aqueous coating agents according to the invention have a hydroxyl value of 0 to 150, preferably less than 100 mg KOH/g, with respect to solid resin. The optional hydroxyl value of the binder may arise from the polyurethane fraction and/or from the polymer fraction.

The aqueous binder dispersions which can be used in aqueous coating agents according to the invention are based on hybrid polymers which can be prepared by radical polymerisation of olefinically unsaturated monomers in the presence of polyurethane resins which contain siloxane bridges and/or silanol groups but which do not contain olefinic double bonds.

The aqueous binder dispersions based on polyurethane/polymer hybrid polymers can be prepared, for example, by converting a polyurethane prepolymer which contains acid groups and does not contain olefinic double bonds, which has, on average, 0.7 to 9 R'—O groups bonded to silicon per molecule, in which R'=C1 to C8 alkyl or C(O)R''', and R'''=C1 to C10 alkyl and which may be present dissolved in a solvent which is inert towards isocyanate, optionally after previous neutralisation of the acid groups, into an aqueous dispersion by adding water, and then subjecting the prepolymer, together with olefinically unsaturated monomers, to radical polymerisation. The olefinically unsaturated monomers may be added before and/or after preparation of the aqueous dispersion. For example, the olefinically unsaturated monomers, or some of them, may take on the function of a solvent which is inert towards isocyanate prior to preparing the aqueous dispersion, and these do not have to be removed at a later stage.

Polyurethane prepolymers which contain acid groups but do not contain olefinic double bonds and with, on average, 0.7 to 9, preferably lateral and/or terminal silicon-bonded R'O groups per molecule may be prepared, for example, by preparing a linear or branched, non-gelled, polyurethane prepolymer which does not contain olefinic double bonds but does contain acid groups and is hydroxy-functional in an inert organic solvent (mixture) and/or in one or more olefinically unsaturated monomers, present as a mixture, which are inert towards isocyanate or in the absence of solvents and olefinically unsaturated monomers and reacting the hydroxyl groups in the polyurethane prepolymer obtained in this way with one or more silanes of the general formula ((OCN—)$_n$R)$_a$Si(OR')$_b$(R'')$_c$ where R=a bifunctional, trifunctional or tetrafunctional, preferably bifunctional, organic group with a molecular weight of 13 to 500, preferably (ar)alkylene with 1 to 12 carbon atoms, particularly preferably alkylene with 1 to 12 carbon atoms, R'=C1 to C8 alkyl or C(O)R''', preferably C1 to C4 alkyl, R''=R'''=C1 to C10 alkyl, wherein R'' and R''' may be identical or different, a=1, 2 or 3, preferably 1, b=1, 2 or 3, preferably 2 or 3, c=0, 1 or 2, n=1 to 3, preferably 1 or 2, particularly preferably 1, wherein several groups R', R'' and R''' are identical or different and in which the sum of a plus b plus c is four.

The polyurethane prepolymers which contain acid groups but do not contain olefinic double bonds and with on average 0.7 to 9 preferably lateral and/or terminal silicon-bonded R'O groups per molecule are preferably prepared, for example, by:

1) preparing a linear or branched, non-gelled, polyurethane prepolymer which does not contain olefinic double bonds but does contain acid groups and is also isocyanate-functional in an inert organic solvent (mixture) and/or in one or more olefinically unsaturated monomers, present as a mixture, which are inert towards isocyanate or in the absence of solvents and olefinically unsaturated monomers, 2) reacting the free isocyanate groups in the polyurethane prepolymer obtained in this way a1) with one or more compounds of the general formula ((H—X—)$_n$R)$_a$Si(OR')$_b$(R'')$_c$  (I)

where X=O, S, NH or NR''', preferably NH or NR''', R=a bifunctional, trifunctional or tetrafunctional, preferably bifunctional, organic group with a molecular weight of 13 to 500, preferably (ar)alkylene with 1 to 12 carbon atoms, particularly preferably alkylene with 1 to 12 carbon atoms, R'=C1 to C8 alkyl or C(O)R''', preferably C1 to C4 alkyl, R''=R'''=C1 to C10 alkyl, wherein R'' and R''' may be identical or different, R'''=C1 to C8 alkyl, a=1, 2 or 3, preferably 1, b=1, 2 or 3, preferably 2 or 3, c=0, 1 or 2, n=1 to 3, preferably 1 or 2, particularly preferably 1, wherein several groups R', R'' and R''' are identical or different and in which the sum of a plus b plus c is four, a2) optionally with alkanolamines which contain one or more NH, and/or NH groups and have an OH-functionality of at least 1, and a3) optionally with one or more aliphatic C4–C36 alcohols and/or amines.

The preparation of R'OSi-functionalised polyurethane prepolymers via NCO-prepolymers may be performed in a so-called one-stage process, i.e. the previously described process steps 1) and 2) may be performed simultaneously by reacting together the reactants required there all at the same time or preferably in a sequential method of preparation. When choosing the reaction partners, the reaction conditions and the sequence of addition of the individual reaction partners, care should be taken to ensure that undesired secondary reactions are excluded.

Preparation of the linear or branched, non-gelled, polyurethane prepolymers which do not contain olefinic double bonds but do contain acid groups and are also isocyanate-functional, taking place for example in step 1), may be performed, for example, by reacting one or more compounds with at least two groups which can react with isocyanate, in particular one or more polyols, preferably diols, with one or more organic polyisocyanates, preferably diisocyanates and with one or more compounds with more than one, preferably two, groups which can react with isocyanate groups and at least one acid group.

For example, a NCO group-containing polyurethane prepolymer which can be used as a starting product can be prepared by reacting, in an anhydrous medium, b1) at least one linear or branched compound which contains at least two groups which can react with isocyanate and with an average molecular weight of 60–10,000, preferably 60–6000, b2) at least one organic polyisocyanate, in particular a diisocyanate, b3) at least one compound with more than one group which can react with isocyanate, and at least one acid group, with a number average molecular weight (Mn) of up to 10,000, preferably up to 2000 with a NCO/OH ratio of more than 1 to 4:1.

The previously mentioned linear or branched compound in component b1) is preferably at least one polyol based on one or more polyethers, polyesters and/or polycarbonates, with at least two OH groups in the molecule and a number average molecular weight (Mn) of 600–10,000, preferably more than 1000 and less than 6000, optionally also using one or more at least difunctional low molecular weight alcohols and/or amines and/or aminoalcohols with a molecular weight of less than 600, preferably less than 400.

All the methods of preparation of NCO group-containing polyurethane prepolymers may be performed as single-stage or multi-stage processes.

The isocyanate group-containing polyurethane prepolymers have a concentration of urethane (—NHCOO—) and optionally urea (—NHCONH—) groups of preferably between 10 and 300 milliequivalents per 100 g of solid resin.

The compounds used as component b1) to prepare NCO group-containing polyurethane prepolymers may be, for example, a linear or branched polyol component, e.g. diols. They are, for example, polyols which are used in the field of polyurethane chemistry and are familiar to a person skilled in the art. If the starting compound is a linear diol, a proportion of polyols with a functionality of 3 or more may be used to produce branching of the polymer. Here, the amount has to be chosen in such a way that no gel formation takes place during synthesis of the NCO group-containing polyurethane prepolymers.

Examples of polyol component b1) may be polyetherpolyols, in particular polyetherdiols, for example polyethylene glycols, polypropylene glycols or polytetrahydrofurandiols.

Polyesterpolyols may be mentioned as further examples of polyol components b1). The polyester polyols may be prepared, for example, by esterification of organic dicarboxylic acids or their anhydrides with organic polyols. The dicarboxylic acids and polyols may be aliphatic, cycloaliphatic or aromatic dicarboxylic acids and polyols. The polyester preferably has a molecular weight of 300 to 6000, an OH value of 20 to 400 and an acid value of less than 3, preferably less than 1. Linear polyesters, that is polyesterdiols, are preferably used.

Polycarbonatediols, for example, may also be used as component b1).

Furthermore, polyesterpolyols, preferably polyesterdiols, which are derived from lactones, can also be used as component b1).

The low molecular weight compounds optionally also used in b1) are in particular alcohols and amines. They are at least difunctional compounds which contain hydroxyl and/or amine groups, have a molecular weight of less than 600, preferably less than 400, and are known per se from polyurethane chemistry in the context of an isocyanate addition reaction. Either difunctional compounds or at least trifunctional compounds, or any mixture of these types of compounds, are suitable in the context of the isocyanate addition reaction.

Any organic polyisocyanates such as, for example, diisocyanates, may be used as component b2). Aliphatic, cycloaliphatic, aromatic or araliphatic diisocyanates my be used. Examples of suitable diisocyanates are hexamethylene diisocyanate, isophorone diisocyanate, bis-(4-isocyanatocyclohexyl)-methane, bis-(4-isocyanatophenyl)-methane, tetramethylxylylene diisocyanate and 1,4-cyclohexylene diisocyanate.

As component b3), low molecular weight compounds which contain more than one, preferably two or at least two, groups which react with isocyanate and at least one acid group are preferably used. Suitable groups which react with isocyanate are in particular hydroxyl groups and primary and secondary amine groups. Carboxyl, phosphoric acid and sulfonic acid groups, for example, are suitable as acid groups. The acid groups preferably incorporated are carboxyl groups; they may be introduced, for example, by using hydroxyalkanecarboxylic acids as component b3).

Dihydroxyalkanoic acids are preferred, in particular alpha,alpha-dimethylolalkanoic acids such as alpha,alpha-dimethylolpropionic acid.

Acid polyesters such as are described in DE-A-39 03 804 may also be used as component b3).

The amounts of b1), b2) and b3) are chosen so that the reaction produces a reaction product with lateral and/or terminal NCO groups, i.e. an excess of polyisocyanate is used. An NCO to OH ratio of more than 1 to 4:1 may be used, but this ratio is preferably in the range 1.1 to 2:1, particularly preferably 1.1 to 1.7:1. The reaction product may have a branched structure, but a linear structure with terminal NCO groups is generally preferred.

The NCO group-containing polyurethane prepolymer obtained in process step 1) is reacted in process step 2)

a1) with one or more compounds of the general formula

$((H\text{—}X\text{—})_nR)_a Si(OR')_b(R'')_c$ (I)

where X=O, S, NH or NR''', preferably NH or NR''', R=a bifunctional to tetrafunctional, preferably bifunctional, organic group with a molecular weight of 13 to 500, preferably (ar)alkylene with 1 to 12 carbon atoms, particularly preferably alkylene with 1 to 12 carbon atoms, R'=C1 to C8 alkyl or C(O)R''', preferably C1 to C4 alkyl, R''=R'''=C1 to C10 alkyl, R'''=C1 to C8 alkyl, a=1, 2 or 3, preferably 1, b=1, 2 or 3, preferably 2 or 3, c=0, 1 or 2, n=1 to 3, preferably 1 or 2, particularly preferably 1 and in which the sum of a plus b plus c is four, a2) optionally with alkanolamines which contain one or more NH$_2$ and/or NH groups and have an OH-functionality of at least 1, and a3) optionally with one or more aliphatic C4–C36 alcohols and/or amines, to give a R'OSi-functionalised polyurethane prepolymer which contains acid groups and does not contain olefinic double bonds.

Compounds of the general formula (I) are silane derivatives which contain groups of the (H—X—)$_n$R— type with active hydrogen atoms which can react with isocyanate groups to give an addition product. The active hydrogen-containing, functional HX-groups are preferably amine groups, n has a value from 1 to 3, n preferably has the value 1. The group R is a bifunctional to tetrafunctional, preferably bifunctional group, which may contain chemically inert groups or substituents, with a molecular weight of 13 to 500. Group R is preferably a bifunctional (ar)alkylene group with 1 to 12 carbon atoms. An alkylene group with 1 to 12 carbon atoms is particularly preferred as group R.

Furthermore, the silane derivative of the general formula (I) contains 1 to 3, preferably 2 or 3 R'—O groups bonded to silicon, wherein R' preferably represents a C1 to C8 alkyl group.

A few preferred examples of compounds (I) which may be mentioned are beta-aminoethyltriethoxysilane, gamma-aminopropyltriethoxysilane, gamma-aminopropyltrimethoxysilane, gamma-aminopropylethyldiethoxysilane, gamma-aminopropylphenyldiethoxysilane, gamma-aminopropyltrimethoxysilane, delta-aminobutyltriethoxysilane, delta-aminobutylethyldiethoxysilane, N-(2-aminoethyl)-3-aminopropyl)-trimethoxysilane, N-2-aminoethyl-3-aminopropyl-tris(2-ethylhexoxy)silane, 6-(amino-hexylaminopropyl)trimethoxysilane, N-aminoethyl-3-aminopropylmethyldimethoxy-silane.

Reaction of the NCO-functional polyurethane prepolymers to give R'OSi-functionalised polyurethane prepolymers takes place with complete consumption of the HX groups in compounds (I).

The polyurethane/polymer hybrid polymers which are used to produce the binder dispersion to be used in aqueous coating agents according to the invention may contain hydroxyl groups. If this is required, then the NCO group-containing polyurethane prepolymers are reacted with at least one $NH_2$ and/or NH group-containing alkanolamine with an OH functionality of at least 1, in the context of optional process step a2), during preparation of the R'OSi-functionalised polyurethane prepolymer. The reaction then takes place with complete consumption of the NH, and/or NH groups in the alkanolamine.

Alkanolamines which contain $NH_2$ and/or NH groups and have an OH functionality of at least 1 are compounds which may be used as the supplier of the hydroxyl groups in the binder dispersion and contribute, solely or together with any hydroxyl groups from the polymer fraction, to the hydroxyl value of the binder. The NH or $NH_2$ groups in the alkanolamines have a much higher reactivity towards the isocyanate groups in the NCO-functional PU prepolymers than that of the OH groups, i.e. the NH groups react preferentially with the isocyanate groups to form a urea.

Examples of suitable alkanolamines with an OH functionality of at least 1 are monoalkanolamines and dialkanolamines, e.g. diethanolamine, N-methylethanolamine, diisopropanolamine, N-ethylisopropanolamine, monoisopropanolamine, ethanolamine, 2,2-aminoethoxyethanol, monoethylethanolamine, butylethanolamine, cyclohexylethanolamine, 3-aminopropanol, 2-aminobutanol-1.

It may be expedient also to use one or more aliphatic C4–C36 alcohols and/or amines, reaction of which generally takes place with complete consumption of their OH, NH and/or $NH_2$ groups, in optional process step a3), instead of or together with the NH, and/or NH group-containing alkanolamines. Fatty amines and/or fatty alcohols with more than 12 carbon atoms are preferred. Examples are lauryl alcohol, stearyl alcohol and the corresponding amines.

The isocyanate groups in the NCO-functional polyurethane prepolymers are preferably reacted with the HX groups from (I), the NH groups in the optionally used alkanolamine and the groups which can react with isocyanate in the optionally used C4–C36 alcohol and/or amine in the stoichiometric ratio. The alkanolamine, C4–C36 alcohol and/or amine and compound (I) may be reacted with the NCO-functional polyurethane prepolymer as a mixture or one after the other in a suitable sequence.

Any optionally still remaining residual free isocyanate groups in the polyurethane prepolymers with on average 0.7 to 9 R'O groups bonded to silicon per molecule may be reacted with conventional compounds which contain active hydrogen atoms capable of adding onto isocyanate before conversion of the prepolymers into the aqueous phase. Examples of suitable active hydrogen-containing compounds are monoalcohols, diols, polyols, glycol ethers, monoamines, diamines, polyamines.

Reaction of the components used to build up the NCO-functional polyurethane prepolymers and also further reaction to give R'OSi-functionalised polyurethane prepolymers takes place in an anhydrous medium, for example at temperatures of 20 to 140° C., preferably between 50 and 100° C. The process may be solvent-free or, as is familiar per se to a person skilled in the art, may be performed in organic solvents suitable for polyurethane synthesis. Water-miscible solvents or water-immiscible solvents may be used as solvents. In general it is advantageous to use those solvents which can be removed at any stage of the preparation of aqueous binder systems (for example, after they have been finally prepared), for example by distilling off, optionally under reduced pressure.

Examples of suitable solvents are ketones, e.g. acetone, methyl ethyl ketone, methyl isobutyl ketone; N-alkylpyrrolidones such as e.g. N-methylpyrrolidone; ethers such as e.g. diethylene glycol dimethyl ether, dipropylene glycol dimethyl ether, or also cyclic urea derivatives such as 1,3-dimethyl-3,4,5,6-tetrahydro-2(1H)-pyrimidinone.

The polyurethane prepolymer with on average 0.7 to 9 R'OSi groups bonded to silicon per molecule obtained in this way is converted into an aqueous dispersion by adding water, preferably after neutralising the acids groups. All or some of the acid groups may be converted into the corresponding salt groups with a neutralising agent. This may take place in all stages of the previously described synthesis, wherein it should be noted that the choice of compounds used for salt production is made in such a way that these behave in a chemically inert manner during the synthesis.

Bases are used for the neutralisation process, e.g. amines, preferably tertiary amines. Examples of suitable bases are ammonia or organic amines such as 2-amino-2-methylpropanol-1; trialkylamines such as trimethylamine, triethylamine, triisopropylamine; N-alkylmorpholines such as N-methylmorpholine; N-dialkyl-alkanolamines such as N-dimethylethanolamine and N-dimethylisopropanolamine and mixtures of these.

Conversion into an aqueous dispersion may take place in such a way that the polyurethane prepolymer is mixed with water. For this purpose, the entire amount of water in one portion or, preferably, only some of the total amount of water is mixed with the polyurethane prepolymer. The water may be added to the resin. It is also possible to add the resin to the water.

The R'OSi groups in the polyurethane prepolymer are sensitive to hydrolysis. A variety of products may be obtained during the course of adding water. For example, it is possible to control whether the hybrid binder contains silicon in the form of siloxane bridges (—Si—O—Si—) incorporated in the polyurethane fraction or in the form of silanol groups bonded to the polyurethane fraction and also the ratio of siloxane bridges to silanol groups.

If the hybrid polymer is intended to contain silicon in the form of silanol groups, for example substantially only in the form of silanol groups, then it is essential that an amount of water is added, within a short time, which is sufficient to prevent further reaction of the silanol groups formed by hydrolysis. The addition of water takes place using more than ten times the stoichiometric excess over the amount of water required to hydrolyse the R'OSi groups. At least 50 times the stoichiometric excess is preferably added. The addition of water is particularly preferably performed in such a way that at least half of the amount of water required to prepare the aqueous dispersion is added in one portion. Any condensation of the silanol groups formed by hydrolysis to give siloxane bridges, with the elimination of water, is largely avoided by adding sufficient water, i.e. an aqueous dispersion of a polyurethane resin which contains virtually no siloxane bridges and which contains silanol groups is obtained.

Preferably, however, the polyurethane prepolymer is subjected to a chain-lengthening procedure with the formation of siloxane bridges by adding a small amount of water which is not sufficient to convert the mixture into the aqueous phase, for example, preferably at least the stoichiometric amount to hydrolyse the R'OSi groups and converting the reaction product into an aqueous dispersion during or after the chain-lengthening procedure, optionally after complete or partial neutralisation. Chain-lengthening of the R'OSi-functionalised polyurethane prepolymer takes place after adding a preferably up to at most ten times the stoichiometric excess, particularly preferably up to at most five times the stoichiometric excess, the calculation being based on the amount of water required to hydrolyse the R'OSi groups. Hydrolysis of the R'OSi groups takes place rapidly. The silanol groups formed by hydrolysis condense with the elimination of water to give siloxane bridges and thus lead to a chain-lengthened polyurethane resin which is virtually free of silanol groups, for example more than 80%, in particular more than 90%, of the silicon is present bonded as siloxane bridges. Depending on the R'OSi-functionalised polyurethane prepolymer used, linear, branched or cross-linked products may be obtained.

Converting the optionally neutralised reaction product into an aqueous dispersion by adding a sufficient amount of water may take place during or after chain-lengthening and formation of the siloxane bridges takes place in the dispersed or non-dispersed resin phase, i.e. chain-lengthening proceeds in the resin phase; thus, if the resin has already been dispersed by adding a sufficient amount of water, then chain-lengthening takes place in the dispersion particles themselves.

The hydrolysis reaction and the optionally proceeding chain-lengthening process also occurring may, if desired, be performed at elevated temperature. Temperatures of up to 95° C., for example, are suitable.

Preparing the aqueous dispersion of the polyurethane resin which contains siloxane bridges and/or silanol groups may be performed by known processes. For example, it is possible to initially introduce the neutralised resin and to add the water while thoroughly dispersing. Likewise, the water phase, optionally containing the neutralising agent, may be initially introduced and the resin is then incorporated with stirring. A continuous method of working is also possible, i.e. resin, water and neutralising agent are simultaneously homogeneously mixed together in known units, e.g. a rotor-stator mixer. Conversion into the aqueous phase may be promoted by an elevated temperature.

The polyurethane resin, present in a solvent-free form or in an organic solution, is converted into the aqueous phase by adding a sufficient amount of water. Addition of the amount of water sufficient to convert into the aqueous phase may take place after completing the chain-lengthening process. It is also possible to add the majority of the water during chain-lengthening and after hydrolysis of the R'OSi groups. A finely divided polyurethane dispersion with an average particle size of greater than 10 and less than 2000 nm, preferably greater than 50 and less than 500 nm, is produced. The distribution may be monomodal or bimodal, preferably monomodal.

After producing the aqueous dispersion of polyurethane resin which contains siloxane bridges and/or silanol groups, preferably substantially only siloxane bridges, the last synthesis stage for preparation of the binder dispersion is performed. This is building up the polymer fraction in the polyurethane/polymer hybrid polymer binder by radical polymerisation using methods which are known per se. Radical polymerisation may be a copolymerisation, proceeding in the presence of the aqueous dispersed polyurethane resin which contains siloxane bridges and/or silanol groups and does not contain olefinic double bonds, of the olefinically unsaturated monomers used to build up the polymer fraction of the polyurethane/polymer hybrid polymer binder, or it may be a graft polymerisation of the olefinically unsaturated monomers used to build up the polymer fraction of the polyurethane/polymer hybrid polymer binder on the polyurethane fraction of the polyurethane/polymer hybrid polymer binder, initiated by H-abstraction from the aqueous dispersed polyurethane resin which contains siloxane bridges and/or silanol groups and does not contain olefinic double bonds, or both forms of radical polymerisation may proceed in parallel. If polyunsaturated monomers are also used during radical polymerisation of the olefinically unsaturated monomers, then radical polymerisation may take place in such a way that the polyunsaturated monomers are copolymerised with complete consumption of their olefinic double bonds or so that some of the polyunsaturated monomers are copolymerised with incomplete consumption of their olefinic double bonds. For example, some of the polyunsaturated monomers may be copolymerised using only some of the relevant unsaturated groups so that the polymer fraction in the resulting polyurethane/polymer hybrid polymers may still contain olefinic double bonds.

The olefinic double bonds participating in the polymerisation process are allylic and/or vinylic double bonds and/or alpha,beta-unsaturated carbonyl groups, for example preferably (meth)acrylic double bonds. The proportion of allylic double bonds is preferably less than 10%, whereas preferably at least 50%, preferably more than 70% of the double bonds are from (meth)acryloyl groups.

Some or all of the olefinically unsaturated monomers may already be present in the aqueous dispersion, as explained above when describing their function as solvent during synthesis of the polyurethane resin or, preferably, at least some of them are added and polymerised after producing the aqueous dispersion. Olefinically unsaturated monomers and radical initiators may be added together, for example as a mixture or dissolved one in the other, or separately, for example also added at different times. It may be expedient to perform the addition of monomers and initiator in such a way that no changes in the solids content are produced during radical polymerisation.

Radical polymerisation is performed at temperatures between 20 and 95° C., preferably between 60 and 90° C.

Examples of radical initiators, which may be used in conventional amounts, are peroxide compounds such as dialkyl peroxides, diacyl peroxides, organic hydroperoxides, peresters, ketone peroxides; azo compounds such as azoisobutyronitrile. Water-soluble radical initiators such as, for example, hydrogen peroxide, ammonium peroxydisulfate, ammonium persulfate, ammonium salts of 4,4'-azobis(4'-cyanopentanoic acid), 2,2'-azobis(2-methyl-N-1,1-bis(hydroxymethyl)-ethyl)-propionamide, 2,2'-azobis (2-methyl-N-2-hydroxyethyl)propionamide.

It is also possible to perform the polymerisation as a redox polymerisation by using corresponding redox initiator systems such as, for example, sodium sulfite, sodium dithionite, ascorbic acid and peroxide compounds.

Radically polymerisable, olefinically unsaturated monomers which may be used are those monomers which do not contain functional groups. Examples are monovinyl aromatic compounds, preferably with 8 to 10 carbon atoms per molecule, such as styrene, vinyltoluene; vinylethers and vinyl esters such as vinyl acetate, vinyl versatate; dialkyl maleates, fumarates, tetrahydrophthalates, but in particular (cyclo)alkyl (meth)acrylates such as methyl (meth)acrylate, ethyl (meth)acrylate, propyl (meth)acrylate, butyl (meth) acrylate, hexyl (meth)acrylate, cyclohexyl (meth)acrylate, ethylhexyl (meth)acrylate, dodecyl (meth)acrylate, lauryl (meth)acrylate, isobornyl (meth)acrylate.

In addition to the non-functional monomers, olefinically unsaturated monomers with functional groups may also be used. Examples are those with CH-acidic, epoxide, hydroxyl or carboxyl groups, wherein it should be noted that the carboxyl-functional monomers should contribute not more than 30% of the acid value of the polyurethane/polymer hybrid polymer binder.

Examples of olefinically unsaturated monomers with hydroxyl groups, which may contribute to the hydroxyl value of the binder according to the invention, solely or together with any hydroxyl groups in the polyurethane fraction, are allyl alcohol, but in particular hydroxyalkyl (meth)acrylates such as hydroxyethyl (meth)acrylate, hydroxypropyl (meth)acrylate or butanediol mono(meth) acrylate, glycerol mono(meth)acrylate, adducts of (meth) acrylic acid and monoepoxides such as e.g. glycidyl esters of versatic acid, adducts of glycidyl (meth)acrylate and monocarboxylic acids such as e.g. acetic acid or propionic acid.

Examples of carboxyl group-containing olefinically unsaturated monomers are unsaturated carboxylic acids such as e.g. (meth)acrylic, itaconic, crotonic, isocrotonic, aconitic, maleic and fumaric acids, semi-esters of maleic and fumaric acid.

A proportion of olefinically unsaturated monomers with at least two polymerisable olefinic double bonds may also be used. The proportion of these monomers may be, for example, 0 to less than 5 wt. %, with respect to the total weight of monomers used to build up the polymer fraction. The proportion of these monomers may also be higher, however, when, for example, the polymer fraction is intended to be more highly branched or cross-linked, the proportion may then be, for example, 5 to 45 wt. % of polyunsaturated monomers, with respect to the total weight of monomers used to build up the polymer fraction. Polyunsaturated monomers are generally exclusively low molecular weight compounds defined by an empirical formula with a molecular weight of generally less than 500. Examples are divinylbenzene, hexanediol di(meth)acrylate, ethylene and propylene glycol di(meth)acrylate, 1,3- and 1,4-butanediol di(meth)acrylate, vinyl (meth)acrylate, allyl (meth)acrylate, diallyl phthalate, glycerol tri(meth)acrylate and di(meth)acrylate, trimethylolpropane tri(meth)acrylate and di(meth)acrylate, pentaerythritol tri(meth)acrylate and tetra(meth)acrylate, di- and tripropylene glycol di(meth) acrylate.

When preparing the aqueous binder dispersion, the proportions by weight of the individual reactants are preferably chosen in such a way and the reaction is performed in such a way that the polyurethane/polymer hybrid polymer on which the aqueous binder dispersion is based has a ratio by weight of polyurethane fraction to polymer fraction of 0.1:1 to 10:1, a hydroxyl value of 0 to 150, preferably less than 100 mg KOH/g, with respect to solid resin, wherein hydroxyl groups bonded to silicon are not taken into account when calculating the OH value, and an acid value of 1.5 to 60 mg KOH/g, preferably 3 to 40 mg KOH/g, with respect to solid resin and a concentration of 0.5 to 300 nmol, preferably 1 to 200 mmol, particularly preferably 5 to 75 mmol of silicon per 100 g of solid resin in the form of siloxane bridges (Si—O—Si) incorporated in the polyurethane fraction and/or in the form of silanol groups bonded to the polyurethane fraction.

The solids content of the binder dispersions used in the aqueous coating agents according to the invention is preferably between 25 and 65 wt. %, particularly preferably more than 35 and less than 60 wt. %.

Solvents optionally contained in the aqueous binder dispersion may, if required, be removed by distillation. This may take place under reduced pressure, for example before or after radical polymerisation.

Aqueous coating agents according to the invention may be prepared from the aqueous binder dispersions. These are preferably water-based base-coat lacquers. Aqueous coating agents according to the invention may be self-drying (physically drying), self-cross-linking or externally cross-linking. The polyurethane/polymer hybrid polymers on which the binder dispersions are based have hydroxyl numbers between 0 and 150, preferably between 0 and 100 mg KOH/g. The hydroxyl value is preferably in the upper part of this range of values if externally cross-linking aqueous coating agents are intended to be prepared.

To prepare aqueous coating agents, preferably water-based base-coat lacquers, pigments, further binders, additives and optionally small amounts of solvents, for example, are added to the aqueous binder dispersion.

Aqueous coating agents according to the invention may contain, in addition to the aqueous binder dispersion, one or more additional binders which differ therefrom. Examples of such additional binders are the conventional film-forming, water-soluble or water-dilutable resins which are familiar to a person skilled in the art, such as water-dilutable polyester resins, water-dilutable polyacrylate resins, water-dilutable polyurethane resins and/or those water-dilutable binders in which (meth)acrylic copolymers and polyurethane resins or (meth)acrylic copolymers and polyester resin are associated in a covalently bonded form or in the form of interpenetrating resin molecules. These may be reactive or non-functional resins. The amount of added resin may be 0 to 75 wt. %, preferably 0 to 50 wt. %, of the total resin solids. 0 to 30 wt. % is particularly preferred. In this connection, resin solids means the sum of all the binders without a cross-linking component.

To prepare aqueous coating agents according to the invention, various cross-linking agents such as, for example, formaldehyde condensation resins, such as phenol/formaldehyde condensation resins and amine/formaldehyde condensation resins, and also free or blocked polyisocyanates, may be used. The cross-linking agents may be used individually or as a mixture. The ratio of mixing of cross-linking agent to binder is preferably 10:90 to 40:60, particularly preferably 20:80 to 30:70, each with respect to the weight of solids.

Furthermore, aqueous coating agents according to the invention may contain polymeric microparticles which are known to a person skilled in the art. Cross-linked or non-cross-linked microparticles may be used.

Furthermore, aqueous coating agents according to the invention may contain lacquer additives, for example rheology-regulating agents, such as highly disperse silica, inorganic layered silicates or polymeric urea compounds. Compounds which also act as thickeners are, for example, water-soluble cellulose ethers such as hydroxyethyl cellulose, methyl cellulose or carboxymethyl cellulose, and also synthetic polymers with ionic and/or associative groups such as polyvinyl alcohol, poly(meth)acrylamide, poly (meth)acrylic acid, polyvinylpyrrolidone, styrene/maleic anhydride or ethylene/maleic anhydride copolymers and their derivatives or also hydrophobically modified ethoxylated polyurethanes or polyacrylates. In addition, anti-sedimentation agents, flow control agents, light stabilisers, catalysts, antifoaming agents such as, for example, silicone-containing compounds; wetting agents and adhesion-promoting substances may be used. Wetting agents are also understood to include known paste resins which may be used for better dispersion and milling of the pigments.

The proportion of solvents in aqueous coating agents according to the invention is preferably less than 20 wt. %, particularly preferably less than 15 wt. %, very particularly preferably less than 10 wt. %. These are conventional lacquer solvents and may arise from preparation of the binder or may be added separately. Examples of such solvents are monohydric or polyhydric alcohols, e.g. propanol, butanol, hexanol; glycol ethers or esters, e.g. diethylene glycol dialkyl ethers, dipropylene glycol dialkyl ethers, each with C1–C6 alkyl groups, ethoxypropanol, butyl glycol; glycols, e.g. ethylene glycol, propylene glycol and its oligomers, N-alkylpyrrolidones such as e.g. N-methylpyrrolidone and ketones such as methyl ethyl ketone, acetone, cyclohexanone; aromatic or aliphatic hydrocarbons, e.g. toluene, xylene or linear or branched aliphatic C6–C12 hydrocarbons. Aqueous coating agents according to the invention may contain one or more inorganic and/or organic colour and/or effect-providing pigments and optionally also at least one filler.

Examples of effect-providing pigments are metal pigments, e.g. consisting of aluminium, copper or other metals; interference pigments such as e.g. metal oxide coated metal pigments, e.g. titanium dioxide coated aluminium, coated mica such as e.g. titanium dioxide coated mica and graphite effect pigments. Examples of colour-providing pigments and fillers are titanium dioxide, micronised titanium dioxide, iron oxide pigments, carbon black, silicon dioxide, barium sulfate, micronised mica, talcum, kaolin, chalk, azo pigments, phthalocyanine pigments, quinacridone pigments, pyrrolopyrrol pigments, perylene pigments.

The effect pigments are generally provided in the form of a commercially available aqueous or non-aqueous paste; preferably water-dilutable, organic solvents and additives are optionally added and then they are mixed with the aqueous binder under shear. Powdered effect pigments may first be processed with preferably water-dilutable organic solvents and additives to give a paste.

Coloured pigments and/or fillers may, for example, be rubbed into some of the aqueous binder. The rubbing in process may also take place in a special water-dilutable paste resin. An example of a paste resin based on polyurethane which can preferably be used in aqueous coating agents according to the invention can be found in DE-A-40 00 889. Rubbing in may be performed in conventional equipment which is familiar to a person skilled in the art. Then, the remaining proportion of aqueous binder or aqueous paste resin is used to complete the final rubbing in of the coloured pigment.

If paste resins are present in aqueous coating agents according to the invention, then these are added to the binder plus optionally present cross-linking agents when calculating the resin solids.

Aqueous coating agents according to the invention contain bases as neutralising agents, for example the same neutralising agents as were mentioned previously for use with the hybrid binder.

Aqueous coating agents according to the invention are preferably formulated as water-based base-coat lacquers such as are used for multi-layered finishes and are overpainted with transparent clear lacquers. These types of water-based base-coat lacquers have a solids content of, for example, 10–50 wt. %; for effect water-based base-coat lacquers it is preferably, for example, 15–30 wt. %, for monocoloured water-based base-coat lacquers it is preferably higher, for example 20–45 wt. %. The ratio by weight of pigment (including filler) to binder plus optional cross-linking agent plus optional paste resin in water-based base-coat lacquers is, for example, between 0.03:1 and 3:1; for effect water-based base-coat lacquers it is preferably 0.06:1 to 0.6:1, for monocoloured water-based base-coat lacquers it is preferably higher, for example 0.06:1 to 2.5:1, each with respect to the weight of solids.

Water-based base-coat lacquers according to the invention may be applied by conventional methods. They are preferably applied by spraying to give a dry layer thickness of 8 to 50 $\mu$m; for effect water-based base-coat lacquers the dry layer thickness is preferably, for example, 10 to 25 $\mu$m, for monocoloured water-based base-coat lacquers it is preferably higher, for example 10 to 40 $\mu$m. Application may also be performed to give very thick layers, for example 25 to 50 $\mu$m, in one spray pass because the aqueous coating agents according to the invention have a high sagging limit. Multiple spray processes and the associated intermediate drying procedures or intermediate evaporation procedures can be avoided. Application preferably takes place as a wet-on-wet process, i.e. after an evaporation phase, e.g. at 20 to 80° C., the water-based base-coat lacquer layers are overpainted with a conventional clear lacquer in a dry layer thickness of preferably 30 to 60 $\mu$m and dried or cross-linked in common with this at temperatures of, for example, 20 to 150° C. The drying conditions for the topcoat layer (water-based base-coat lacquer according to the invention and clear lacquer) are governed by the clear lacquer system used. For repair purposes, temperatures of, for example, 20 to 80° C. are preferred. For the purposes of mass-production lacquering, temperatures of more than 100° C., for example more than 110° C., are preferred.

In principle, any known clear lacquers or transparent pigmented coating agents are suitable as the clear lacquer. Here, either solvent-containing, single-component or two-component clear lacquers, water dilutable clear lacquers, powder coating clear lacquers, aqueous powder coating clear lacquer slurries or clear lacquers which can be cured by irradiation may be used.

Multi-layered finishes produced in this way may be applied to a wide variety of substrates. In general, they are metallic or plastics substrates. These are frequently pre-coated, i.e. plastics substrates may be provided with e.g. a plastics primer, metallic substrates generally have an electrophoretically applied primer and optionally also one or more further lacquer layers such as e.g. a filler layer. These layers have generally been cured.

Multi-layered finishes obtained with water-based base-coat lacquers according to the invention satisfy the currently conventional requirements for motor vehicle finishes. Water-based base-coat lacquers according to the invention are thus suitable for initial vehicle finishes and for vehicle repair finishes, but they may also be used in other areas, e.g. plastics finishes, in particular for finishes on vehicle parts.

The invention also provides a substrate, coated with a multi-layered coating which has been obtained by applying at least one primer, preferably based on a water-dilutable coating agent, applying a colour and/or effect-providing base-coat lacquer layer using an aqueous coating agent according to the invention, optionally drying the base-coat lacquer layer and applying a transparent coating agent as a top layer and then heating the coated substrate. Optionally, further additional layers may be added to this multi-layered finish.

Aqueous coating agents according to the invention are suitable in particular as water-based base-coat lacquers for producing a colour and/or effect-providing coating layer within a multi-layered finish. Aqueous coating agents according to the invention may be applied in only one spray pass, even when producing a thick layer, which is of particular importance when applying layers of lacquer with poorly covering shades of colour.

EXAMPLES

Preparation Example 1

145.4 g of a polyester of adipic acid, neopentyl glycol and isophthalic acid (OH value: 109 mg KOH/g) and 8.0 g of dimethylolpropionic acid are dissolved in 69.6 g of N-methylpyrrolidone and heated to 40° C. Then, 55.8 g of isophorone diisocyanate are added in such a manner that a reaction temperature of 80° C. is not exceeded. This is maintained until an NCO content of 2% (with respect to solid resin and determined according to DIN 53185) is achieved. Then 7.0 g of 3-aminopropyltriethoxysilane and 15.0 g of dodecanol are added, one after the other. The reaction mixture is held at 80° C. until free NCO groups can no longer be detected (titration). Then 128.0 g of methyl methacrylate are added. 5.4 g of triethylamine and 5.4 g of deionised water are added and thoroughly incorporated. After adding 864.0 g of deionised water, a finely divided aqueous dispersion is obtained. Now, 250.0 g of butyl acrylate, 125.0 g of tert.-butyl acrylate and a solution of 62.0 g of deionised water and 2.0 g of ammonium peroxydisulfate are added continuously over the course of 2 h at 80° C. Finally, the mixture is maintained at 80° C. for 3 hours and adjusted to a solids content (60' 150° C.) of 40.0 wt. % with deionised water.

Preparation Example 2

339.0 g of a polyester of adipic acid, neopentyl glycol and cyclohexanedicarboxylic acid (OH value: 104 mg KOH/g) and 13.7 g of dimethylolpropionic acid are dissolved in 160.0 g of N-methylpyrrolidone and heated to 40° C. Then, 125.0 g of isophorone diisocyanate are added in such a manner that a reaction temperature of 80° C. is not exceeded. This is maintained until an NCO content of 2% (with respect to solid resin and determined according to DIN 53185) is achieved. Then 43.8 g of 3-aminopropyltriethoxysilane and 20.8 g of diethanolamine are added, one after the other. The reaction mixture is held at 80° C. until free NCO groups can no longer be detected (titration). Then 128.0 g of methyl methacrylate are added. 9.2 g of triethylamine and 9.2 g of deionised water are added and thoroughly incorporated. After adding 1300.0 g of deionised water, a finely divided aqueous dispersion is obtained. Now, 240.0 g of butyl acrylate, 175.0 g of tert.-butyl acrylate and a solution of 100.0 g of deionised water and 4.0 g of ammonium peroxydisulfate are added continuously over the course of 2 h at 80° C. Finally, the mixture is maintained at 80° C. for 3 hours and adjusted to a solids content (60' 150° C.) of 40.0 wt. % with deionised water.

Preparation Example 3

772.0 g of a polyester of adipic acid, neopentyl glycol and isophthalic acid (OH value: 100 mg KOH/g) and 89.0 g of dimethylolpropionic acid are dissolved in 412.0 g of N-methylpyrrolidone and heated to 40° C. Then, 375.0 g of isophorone diisocyanate are added in such a manner that a reaction temperature of 80° C. is not exceeded. This is maintained until an NCO content of 2% (with respect to solid resin and determined according to DIN 53185) is achieved. Then 41.0 g of 3-aminopropyltriethoxysilane and 89.2 g of dodecanol are added, one after the other. The reaction mixture is held at 80° C. until free NCO groups can no longer be detected (titration). Then 886.0 g of styrene are added. 60.0 g of triethylamine are added and thoroughly incorporated. After adding 4500.0 g of deionised water, a finely divided aqueous dispersion is obtained. Now, 178.0 g of hydroxyethyl methacrylate, 712.0 g of butyl acrylate, 890.0 g of tert.-butyl acrylate and a solution of 850.0 g of deionised water and 50.0 g of ammonium peroxydisulfate are added continuously over the course of 2 h at 80° C. Finally, the mixture is maintained at 80° C. for 3 hours and adjusted to a solids content (60= 150° C.) of 40.0 wt. % with deionised water.

Preparation Example 4

697.3 g of a polyester of adipic acid, neopentyl glycol and isophthalic acid (OH value: 100 mg KOH/g) and 80.0 g of dimethylolpropionic acid are dissolved in 372.0 g of N-methylpyrrolidone and heated to 40° C. Then, 338.0 g of isophorone diisocyanate are added in such a manner that a reaction temperature of 80° C. is not exceeded. This is maintained until an NCO content of 2% (with respect to solid resin and determined according to DIN 53185) is achieved. Then 37.2 g of 3-aminopropyltriethoxysilane and 83.6 g of dodecanol are added, one after the other. The reaction mixture is held at 80° C. until free NCO groups can no longer be detected (titration). Then 400.0 g of methyl methacrylate are added. 54.2 g of triethylamine and 54.2 g of deionised water are added and thoroughly incorporated. After adding 3900.0 g of deionised water, a finely divided aqueous dispersion is obtained. Now, 267.0 g of hydroxyethyl methacrylate, 1066.0 g of butyl acrylate, 663.0 g of tert.-butyl acrylate and a solution of 1000.0 g of deionised water and 40.0 g of ammonium peroxydisulfate are added continuously over the course of 2 h at 80° C. Finally, the mixture is maintained at 80° C. for 3 hours and adjusted to a solids content (60' 150° C.) of 40.0 wt. % with deionised water.

Lacquer Example 1

1.1 Preparing a Monocoloured, Red, Water-based Base-coat Lacquer 300 g of a conventional paste resin (in accordance with the example from DE-OS 4 000 889) are blended with 350 g of a commercially available vat pigment (Colour index Red 168). The mixture is adjusted to a pH of 8.5 with dimethylethanolamine and to a solids content of 50 wt. % by adding deionised water. Then the mixture is dispersed in a pearl mill until it is transparent.

1.2

1.4 g of a commercially available thickener based on polyacrylic acid (solids: 10 wt. %, pH 7.5) are mixed with 129 g of the dispersion from preparation example 1 and 40 g of the paste resin from example 1.1. Then, with stirring, 24 g of a commercially available, water-insoluble, melamine resin (Setamine US 138/BB 70 from the AKZO Co.) are added, with stirring. Finally, 10 g of the red paste from example 1.1 are added and stirred in until the mixture is homogeneous. The mix is adjusted to application viscosity with deionised water.

1.3 Applying the Water-based Base-coat Lacquer and a Clear Lacquer

The water-based base-coat lacquer obtained is applied, to give a dry layer thickness of 30 μm, by spraying onto a conventional, phosphated car body sheet which has been precoated with a cathodic electrodeposition layer and with a filler. After application, the layer is allowed to evaporate at room temperature for 10 minutes and is then predried at 80° C. for 10 minutes. Finally, a commercially available, melamine resin curing car mass production lacquer based on an acrylate resin is overpainted in a dry layer thickness of 35 μm and dried at 120° C. (object temperature) for 18 minutes.

A multi-layered finish is obtained which complies with the specifications which are becoming conventional for mass-produced car finishes.

Furthermore, the water-based base-coat lacquer obtained is applied to a conventional, phosphated car body sheet which has been precoated with a cathodic electrodeposition layer and with a filler, by spraying in a wedge (dry layer thickness of 0 to 50 μm). This took place using a lacquering robot without intermediate evaporation. The sagging limit was 42 μm.

Lacquer Example 2

Lacquer example 1 was repeated with the difference that, instead of the dispersion from preparation example 1, the dispersion from preparation example 2 is used. No sagging was observed, i.e. the sagging limit was more than 50 μm.

Lacquer Example 3
Preparing a Silver Metallic Two-layered Finish 20 g of a commercially available aluminium paste suitable for a water-based base-coat lacquer, with 65 wt. % of aluminium, 20 g of butyl glycol, 6 g of N-methylpyrrolidone and 1 g of a commercially available wetting agent are mixed with each other to give a bronze product. Then, 1.4 g of a commercially based thickener based on polyacrylic acid (solids: 10 wt. %, pH 7.5) are added thereto. Then 129 g of the dispersion from preparation example 1 and 40 g of the paste resin from lacquer example 1.1 are stirred into the bronze product. Finally, with stirring, 24 g of a commercially available, water-insoluble, melamine resin (Setamine US 138/BB 70 from the Akzo Co.) are added with stirring. The mixture is adjusted to application viscosity with deionised water.

The water-based base-coat lacquer obtained is applied by spraying onto a conventional, phosphated car body sheet which has been precoated with a cathodic electrodeposition layer and with a filler. This was performed in such a way as to provide a dry layer thickness of 15 μm. After application, the lacquer is allowed to evaporate at room temperature for 10 minutes and then predried at 80° C. for 10 minutes. Then a commercially available melamine resin curing car mass-production clear lacquer based on an acrylate resin is overpainted in a dry layer thickness of 35 μm and dried at 120° C. (object temperature) for 18 minutes.

A multi-layered finish is obtained which complies with the specifications which are becoming conventional for mass-produced car finishes.

Furthermore, the water-based base-coat lacquer obtained is applied to a conventional, phosphated car body sheet which has been precoated with a cathodic electrodeposition layer and with a filler, by spraying in a wedge (dry layer thickness of 0 to 50 μm). This took place using a lacquering robot without intermediate evaporation. The sagging limit is 33 μm.

Lacquer Example 4

Lacquer example 3 is repeated with the difference that the dispersion from preparation example 2 is used instead of the dispersion from preparation example 1. The sagging limit is 47 μm.

What is claimed is:
1. An aqueous coating agent comprising an aqueous binder dispersion and optionally organic solvents, cross-linking agents, pigments, fillers, conventional lacquer additives and additional binders, wherein the aqueous binder dispersion consists of a polyurethane/polymer hybrid polymer, wherein said hybrid polymer
   (a) has a ratio by weight of polyurethane fraction to polymer fraction of 0.1:1 to 50:1,
   (b) a hydroxyl value of 0 to 150 mg KOH/g, with respect to the solid resin but excluding hydroxyl groups bonded to silicon,
   (c) an acid value of 1.5 to 60 mg KOH/g, with respect to the solid resin,
   (d) a concentration of 0.5 to 300 mmol of silicon per 100 g of solid resin and associated with the polyurethane fraction of the hybrid polymer and consisting of siloxane bridges of the formula incorporated into the polyurethane fraction,
wherein said silicon concentration is obtained by polymerization of olefinic unsaturated monomers in the presence of polyurethane resins; said polyurethane resins do not contain olefinic double bonds and do contain silicon in the form of siloxane bridges of the formula —Si—O—Si—.

2. A process for preparing aqueous coating agents according to claim 1, by preparing an aqueous binder dispersion and optionally blending this with the required other components, as defined in claim 1, wherein the aqueous binder dispersion is prepared by converting a polyurethane prepolymer which contains acid groups and does not contain olefinic double bonds, which has, on average, 0.7 to 9 R'—O groups bonded to silicon per molecule, in which
   R'=C1 to C8 alkyl or C(O)R''', and
   R'''=C1 to C10 alkyl
wherein the polyurethane prepolymer is optionally dissolved in a solvent which is inert toward isocyanate and the acid groups have optionally been previously neutralized, by adding water and then subjecting the prepolymer to radical polmerization together with one or more olefinancially unsaturated monomers.

3. A process according to claim 2, wherein the polyurethane prepolymers are prepared by reacting the free isocyanate groups in a polyurethane prepolymer which does not contain double bonds
   a1) with one or more compounds of the general formula

where
   X=O, S, NH or NR$^{iv}$, preferably NH or NR$^{iv}$,
   R=a bifunctional, trifunctional or tetrafunctional, preferably bifunctional, organic group with a molecular weight of 13 to 500,
   R'=C1 to C8 alkyl or C(O)R''',
   R''=R'''=C1 to C10 alkyl, wherein R'' and R''' may be identical or different,
   R$^{iv}$=C1 to C8 alkyl, a=1, 2 or 3, b=1, 2 or 3, c=0, 1 or 2, n=1 to 3, wherein several groups R', R'' and R''' are identical or different and in which the sum of a plus b plus c is four,
   a2) optionally with alkanolamines which contain one or more NH$_2$ and/or NH groups and have an OH-functionality of at least 1, and
   a3) optionally with one or more aliphatic C4–C36 alcohols and/or amines.

4. A process for preparing multi-layered finishes by applying a base-coat lacquer layer and a clear lacquer layer to an optionally pretreated substrate, wherein the base-coat lacquer layer is produced by using a coating agent according to claim 1.

5. A process according to claim 4, wherein the base-coat lacquer layer is applied to form a dry layer having a thickness of 8 to 50 μm.

6. A process according to claim 4, wherein the base-coat lacquer layer is applied using a single spray process.

7. A substrate coating with a multi-layered finish wherein at least one layer of the finish is the coating agent of claim 1.

8. The aqueous coating agent of claim 1 in which the polyurethane resins has on average 0.7 to 9 R'—O groups bonded to silicon per molecule in which
   R'=C1 to C8 alkyl or C(O)R''', and
   R'''=C1 to C10 alkyl.

* * * * *

UNITED STATES PATENT AND TRADEMARK OFFICE
CERTIFICATE OF CORRECTION

PATENT NO. : 6,437,041 B1
DATED : August 20, 2002
INVENTOR(S) : Bosch et al.

It is certified that error appears in the above-identified patent and that said Letters Patent is hereby corrected as shown below:

<u>Column 4,</u>
Line 14, -- NH2 and/or NH -- instead of "NH and/or NH";

<u>Column 7,</u>
Lines 6-7 and 30, -- NH2 and/or NH -- instead of "NH and/or NH";

<u>Column 16,</u>
Line 30, -- 60' -- instead of "60=";

<u>Column 18,</u>
Line 2, -- formula (si-O-si) incorporated -- instead of "formula incorporated";
Line 57, -- spray pass -- instead of "spray process";

Signed and Sealed this

Twenty-fifth Day of February, 2003

JAMES E. ROGAN
*Director of the United States Patent and Trademark Office*